(12) United States Patent
Xiao et al.

(10) Patent No.: US 12,506,395 B2
(45) Date of Patent: Dec. 23, 2025

(54) SUPERCONDUCTING MOTOR WITH SPOKE-SUPPORTED ROTOR WINDINGS

(71) Applicant: Hinetics LLC, Champaign, IL (US)

(72) Inventors: Jianqiao Xiao, Champaign, IL (US); Kiruba S. Haran, Champaign, IL (US)

(73) Assignee: Hinetics LLC, Champaign, IL (US)

(*) Notice: Subject to any disclaimer, the term of this patent is extended or adjusted under 35 U.S.C. 154(b) by 1109 days.

(21) Appl. No.: 17/498,294

(22) Filed: Oct. 11, 2021

(65) Prior Publication Data

US 2022/0302816 A1 Sep. 22, 2022

Related U.S. Application Data

(60) Provisional application No. 63/161,769, filed on Mar. 16, 2021.

(51) Int. Cl.
*H02K 3/46* (2006.01)
*H02K 15/08* (2006.01)
*H02K 55/04* (2006.01)

(52) U.S. Cl.
CPC ............... *H02K 55/04* (2013.01); *H02K 3/46* (2013.01); *H02K 15/08* (2013.01)

(58) Field of Classification Search
CPC ........... H02K 3/47; H02K 15/08; H02K 3/46; H02K 55/04; H02K 7/14
See application file for complete search history.

(56) References Cited

U.S. PATENT DOCUMENTS

| | | | | |
|---|---|---|---|---|
| 4,184,089 A * | 1/1980 | Sterrett | ................ | H02K 55/04 310/91 |
| 6,140,719 A * | 10/2000 | Kalsi | ..................... | H02K 55/04 310/52 |
| 6,489,701 B1 * | 12/2002 | Gamble | ................... | H02K 3/24 310/55 |
| 2008/0067881 A1 * | 3/2008 | Winn | ..................... | H02K 55/04 310/52 |
| 2018/0375419 A1 * | 12/2018 | Rebsdorf | ............... | H02K 1/30 |

* cited by examiner

*Primary Examiner* — Leda T Pham
(74) *Attorney, Agent, or Firm* — Boyle Fredrickson, S.C.

(57) ABSTRACT

A lightweight superconducting machine suitable for aerospace applications provides a wound-field rotor suspended from a driveshaft by insulating tensile spokes. The resultant reduction in heat transmission allows a cryocooler positioned centrally within the rotor to cool the machine coils through radially conducting straps.

26 Claims, 10 Drawing Sheets

SUPERCONDUCTING MOTOR WITH SPOKE-SUPPORTED ROTOR WINDINGS

CROSS REFERENCE TO RELATED APPLICATION

This application claims the benefit of U.S. provisional application 63/161,769 filed Mar. 16, 2021 and hereby incorporated by reference.

BACKGROUND OF THE INVENTION

The present invention relates to high-power-to weight electric motors for aerospace applications, and in particular to a superconducting electric motor having a spoke support system for the rotor.

Electric motors for aerospace applications, for example, for use in aircraft, desirably provide a high specific power, that is high power output with light weight. Currently produced wound-field synchronous motors can provide about two kilowatts of power per kilogram of weight with a nominal efficiency of about 90 percent. Recent advances using permanent magnets have achieved specific power in excess of 13 kilowatts per kilogram with efficiencies in excess of 96 percent; however, the fault tolerance of such permanent magnet systems has not been established.

Desirably, the permanent magnets of such electric motors could be replaced with superconducting coils to provide improved efficiency and lighter weight (greater specific power). The substantial demands of cryogenic cooling sufficient to cool such motors, however, present a significant challenge because of the weight, complexity, and bulk of such coolers and the necessary plumbing for fluids used for heat transfer between the motor and the cooler.

SUMMARY OF THE INVENTION

The present invention provides an electric motor design with greatly reduced cooling demands by confining the cooling to the rotor (which may be isolated in a rotor-specific vacuum envelope) and minimizing heat transfer between the rotor and the rotor shaft or other structures by suspending the rotor on the rotor shaft with high thermal resistance tensile spokes. The resulting reduced heat flow allows direct conductive cooling of the rotor coils using a cryocooler, for example, extending partially into the shaft and communicating with the coils through radially-extending conductive straps.

More specifically, the present invention provides a superconducting motor having a stator and a rotor fitting within the stator with a shaft rotatably mounted with respect to the stator to allow the rotor to rotate about a shaft axis with respect to the stator. The rotor includes a rotor shell suspended about the shaft by a balanced tension among flexible spokes passing between the rotor shell and the shaft. The rotor shell in turn supports a set of superconducting windings positioned on the rotor shell.

It is thus a feature of at least one embodiment of the invention to provide a rotor with high thermal isolation to allow a cryogenic wound-field rotor with reduced cooling demands. The spokes may present small cross-sectional connections between a shaft (at non-cryogenic temperatures) and the cryogenic rotor shell while providing high tensile strength and thus a rigid fixation of the rotor shell with respect to the shaft.

In one embodiment, the spokes may be constructed of a polymer material, for example, a material similar to Kevlar™, Mylar™, and Kapton™.

It is thus a feature of at least one embodiment of the invention to take advantage of the high thermal resistance of polymer materials that can nevertheless provide lightweight and tensilely strong structures.

The spokes may be angled circumferentially away from lines of radius about the shaft axis, for example, and in some cases may extend from the shaft axis tangentially.

It is thus a feature of at least one embodiment of the invention to provide strong resistance to torques between the driveshaft and rotor shell and minimize the effect of elasticity in the materials in affecting structural rigidity. It is yet another feature of at least one embodiment of the invention to make use of the angulation and the multiple dimensions of contraction of the rotor shell during cooling to maintain spoke tension.

The spokes may be angled axially away from lines of radius about the shaft axis.

It is thus a feature of at least one embodiment of the invention to use the same spokes to provide resistance against axial shifting between the driveshaft and rotor shell.

The superconducting windings may be planar coils conformed to a substantially cylindrical surface of the rotor shell.

It is thus a feature of at least one embodiment of the invention to provide lightweight but efficient field coils that can be easily cooled when attached to a cooled surface, for example, of the rotor shell.

In one embodiment, the superconducting windings may be helical windings.

It is thus a feature of at least one embodiment of the invention to increase the surface area-to-volume of the coil for improved coil cooling.

The motor may further include a cryocooler driven by mechanical rotation.

It is thus a feature of at least one embodiment of the invention to provide self-contained cryogenic cooling system using a simple mechanical cooling structure readily driven by the electric motor or similar airborne device and practical because of the reduced cooling requirements of the motor.

The cryocooler may have a cold end extending coaxially inside the rotor shell and providing radially extending conductors communicating between the cold end and the superconducting windings on the rotor shell.

It is thus a feature of at least one embodiment of the invention to simply integrate the cryocooler into the motor so as to communicate thermally with the coils of the rotor shell.

The conductive straps may be metal conductors.

It is thus a feature of at least one embodiment of the invention to provide a simple heat conduit system allowing localized cooling of the rotor coils without the need for complex fluid pumping and routing systems.

The driveshaft may be tubular and the cold end may extend inwardly through the tubular shaft.

It is thus a feature of at least one embodiment of the invention to reduce the weight of the driveshaft while providing good torque resistance and to use this a tubular form to provide a simple method of introducing the cold end of the cryocooler into the center of the rotor.

The cryocooler may be a sterling cycle cooler.

It is thus a feature of at least one embodiment of the invention to provide a superconducting electric motor with cooling requirements that can be satisfied by an efficient mechanical heat pump.

The electric motor may further include a vacuum envelope fixed to the rotor to rotate therewith to contain the rotor shell within a vacuum.

It is thus a feature of at least one embodiment of the invention to minimize the heat loss through conduction through the air from the rotor shell and isolate the cooling of the electric motor to the rotor shell (rather than the entire motor) to re-further reduce cooling loads.

The motor may also provide a wireless power transfer circuit having a first portion stationary with respect to the stator and outside of the vacuum envelope and a second portion attached to rotate with the rotor inside of the vacuum envelope for wireless transfer of power from the first portion to the second portion; wherein the second portion communicates with the set of superconducting windings to provide exciting power to the windings for the production of a magnetic field.

It is thus a feature of at least one embodiment of the invention to provide a method of exciting and maintaining superconducting current flow through a vacuum envelope operating to isolate the rotor shell and windings.

The rotor further may be attached to an impeller extending radially from the rotor to blow air over the stator.

It is thus a feature of at least one embodiment of the invention to expose the stator windings to airflow outside of the vacuum envelope.

The rotor shell may provide a set of attachable forms underlying each superconducting winding adapted to allow molding of the winding to the form and subsequent assembly of the form into the shell.

It is thus a feature of at least one embodiment of the invention to simplify close integration of the rotor coils with the rotor shell by molding them in place while facilitating manufacturing by allowing molding away from the assembled shell.

These particular objects and advantages may apply to only some embodiments falling within the claims and thus do not define the scope of the invention.

DETAILED DESCRIPTION OF THE PREFERRED EMBODIMENT

Figure 1:
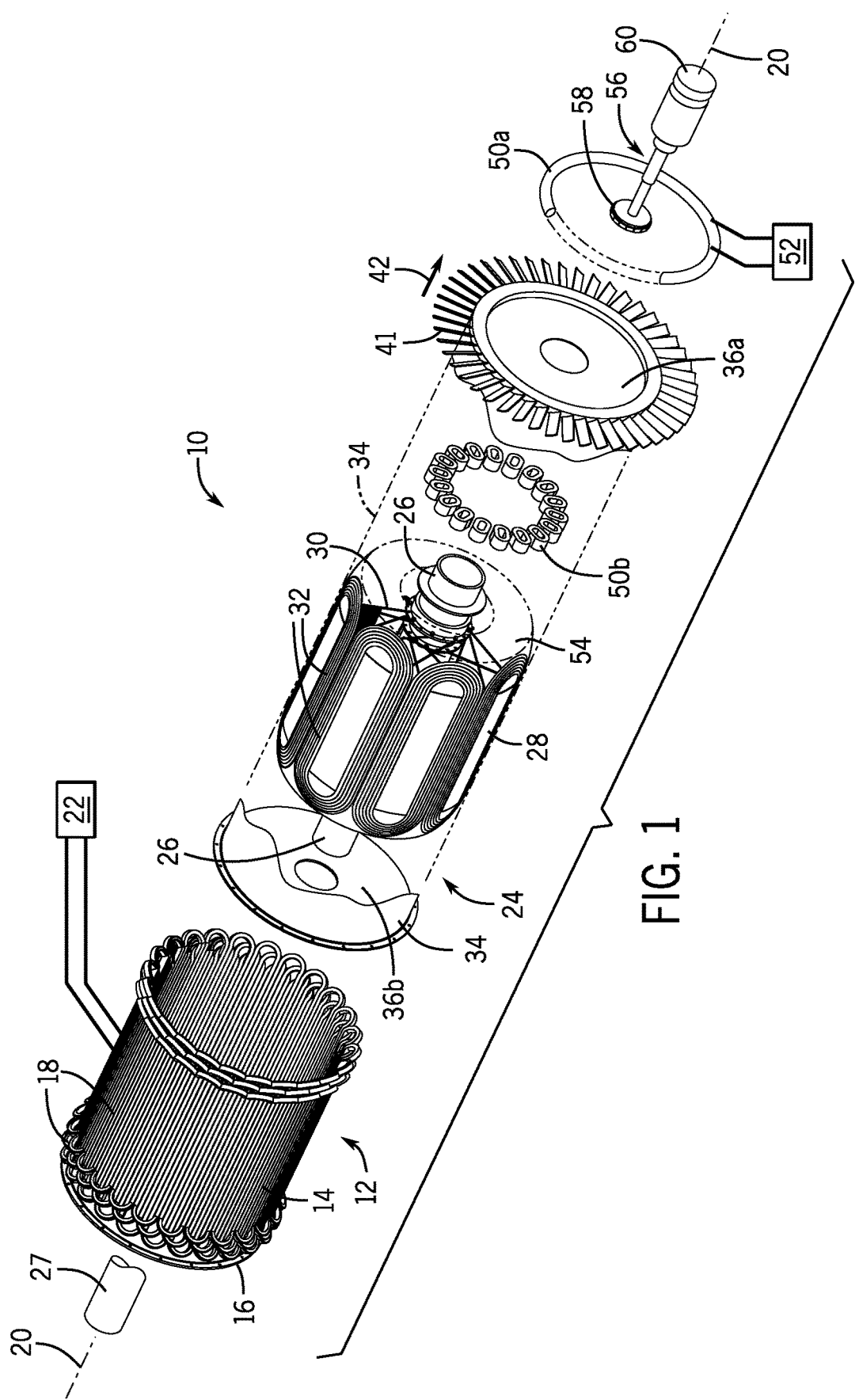
FIG. 1 is a simplified exploded view of the principal components of a motor constructed according to the present invention including a stator and a concentrically rotating wound-field rotor within a vacuum envelope.

Referring now to FIG. 1, a superconducting motor 10 of the present invention may include a stator 12 providing, in one embodiment, a generally cylindrical, tubular stator form 14 having an outwardly flared end 16. A set of stator coils 18 may be attached to an inner surface of the stator form 14 spaced angularly about an axis 20 of the stator form 14 and extending between its opposite ends in a race-track shape. The stator coils 18 may be air-core coils stabilized in a potting material as attached to the stator form 14 and may communicate with a motor drive circuit 22, for example, sequentially energizing the stator coils 18 to create a rotating magnetic field about the axis 20 as is generally understood in the art.

Figure 2:
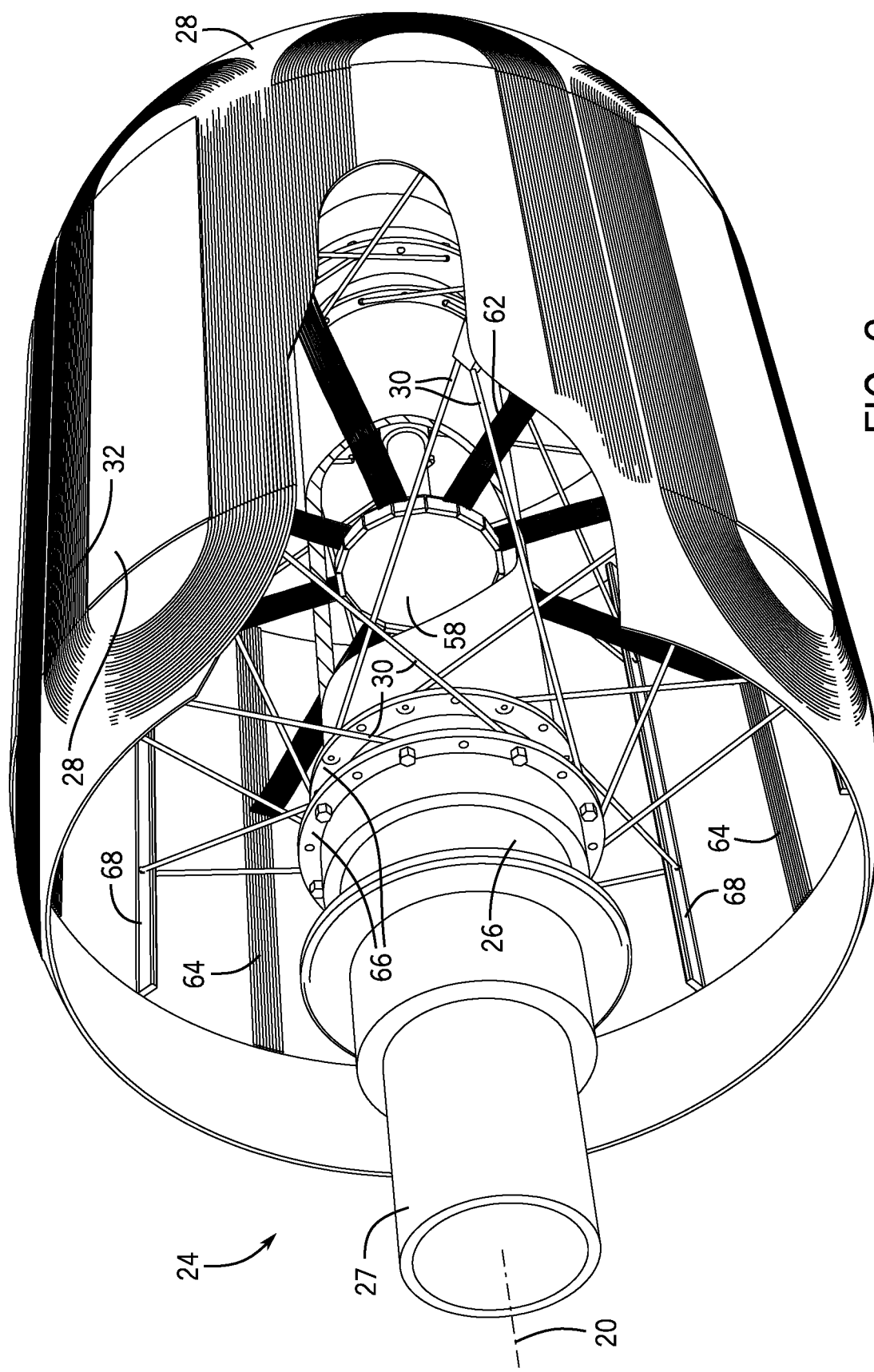
FIG. 2 is a partial cutaway perspective view of the motor of FIG. 1 showing conductive straps of a cryocooler and a spoke structure for supporting a rotor shell about the central driveshaft.
Figure 3:
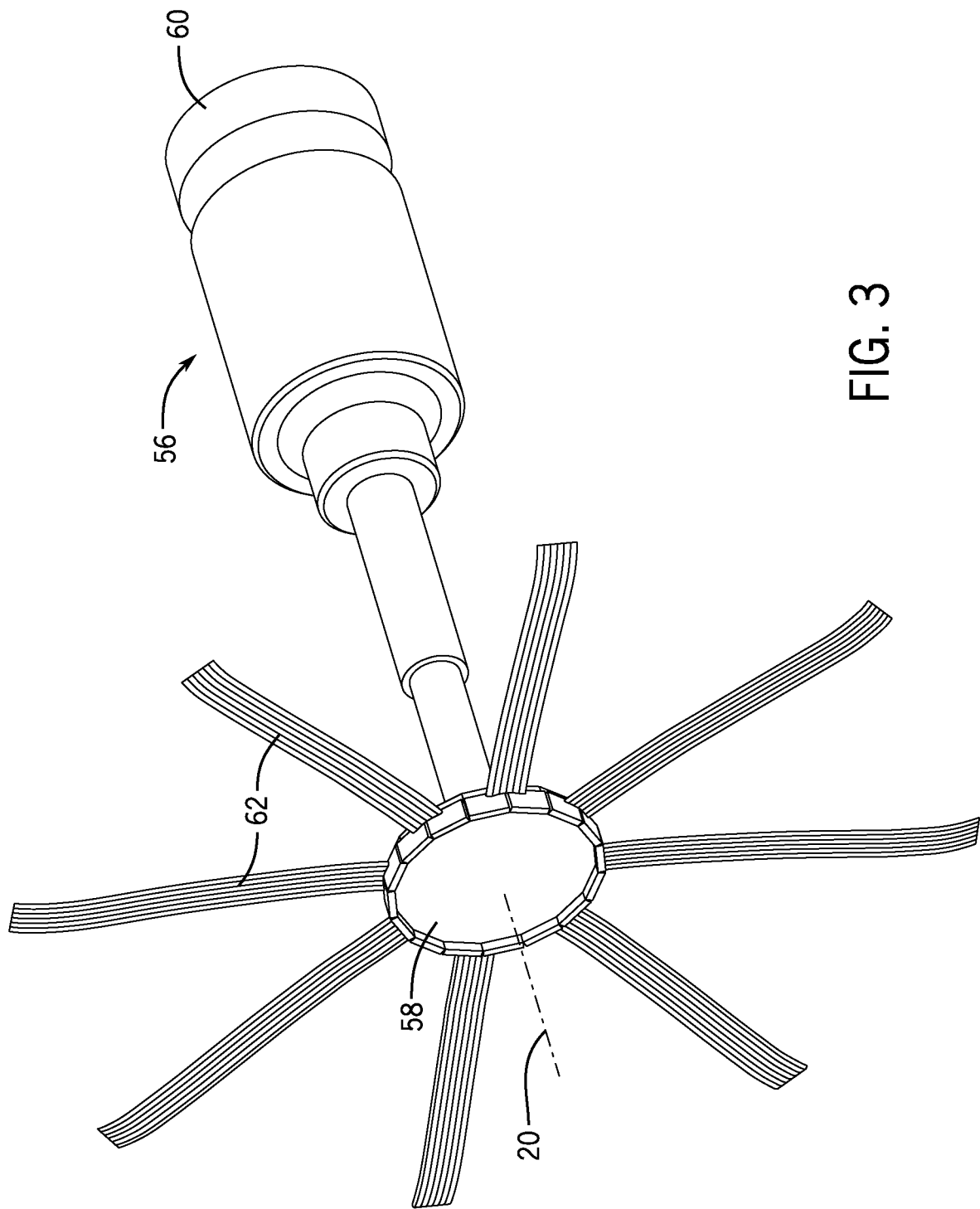
FIG. 3 is a perspective view of the cryocooler and conductive spokes isolated from other structures of the motor.

Referring also now to FIG. 2, fitting within the stator form 14 to rotate therein about the axis 20 is a rotor 24 providing a tubular rotor shaft 26 that may communicate beyond the confines of the motor 10 as a driveshaft 27 connected, for example, to turbine or propeller systems of aircraft or the like (not shown). The tubular shaft 26 may be supported for rotation on bearings 29 (shown in FIG. 6) as are generally understood in the art.

A rotor shell 28 is positioned concentrically around the shaft 26 and held for co-rotation with the shaft 26 by a set of thermally insulated spokes 30 radiating outwardly from the shaft 26 as will be discussed in more detail below. The rotor shell 28 may be a substantially cylindrical tube, for example, of aluminum or other lightweight material, to have low weight and low moment of inertia. Opposite ends of the rotor shell 28 may be necked in slightly inward for improved structural rigidity. The rotor shell 28 will typically have a radial thickness of less than 100th of the radius of the shell 28 from the axis 20.

An outer surface of the rotor shell 28 includes a set of rotor coils 32 also having an elongate racetrack shape with a longest dimension extending between axial ends of the rotor shell 28. The rotor coils 32 will be spaced circumferentially around the rotor shell 28 at equal angular intervals and may be air-core planar coils, the latter term, as used herein, meaning that the coils are substantially two-dimensional being wound helically in one or a limited number of layers to conform to a surface that is not necessarily but may be planar. Generally, the rotor coils 32 will be high temperature superconductive materials so as sustain a strong magnetic field without significant power consumption in the manner of a permanent magnet but with much lower mass and hence weight.

The stator coils 18 and rotor coils 32 may be integrated with sensors, for example strain and temperature sensors, that may be wirelessly monitored, for example, to detect quenching or imminent failure.

Figure 6:
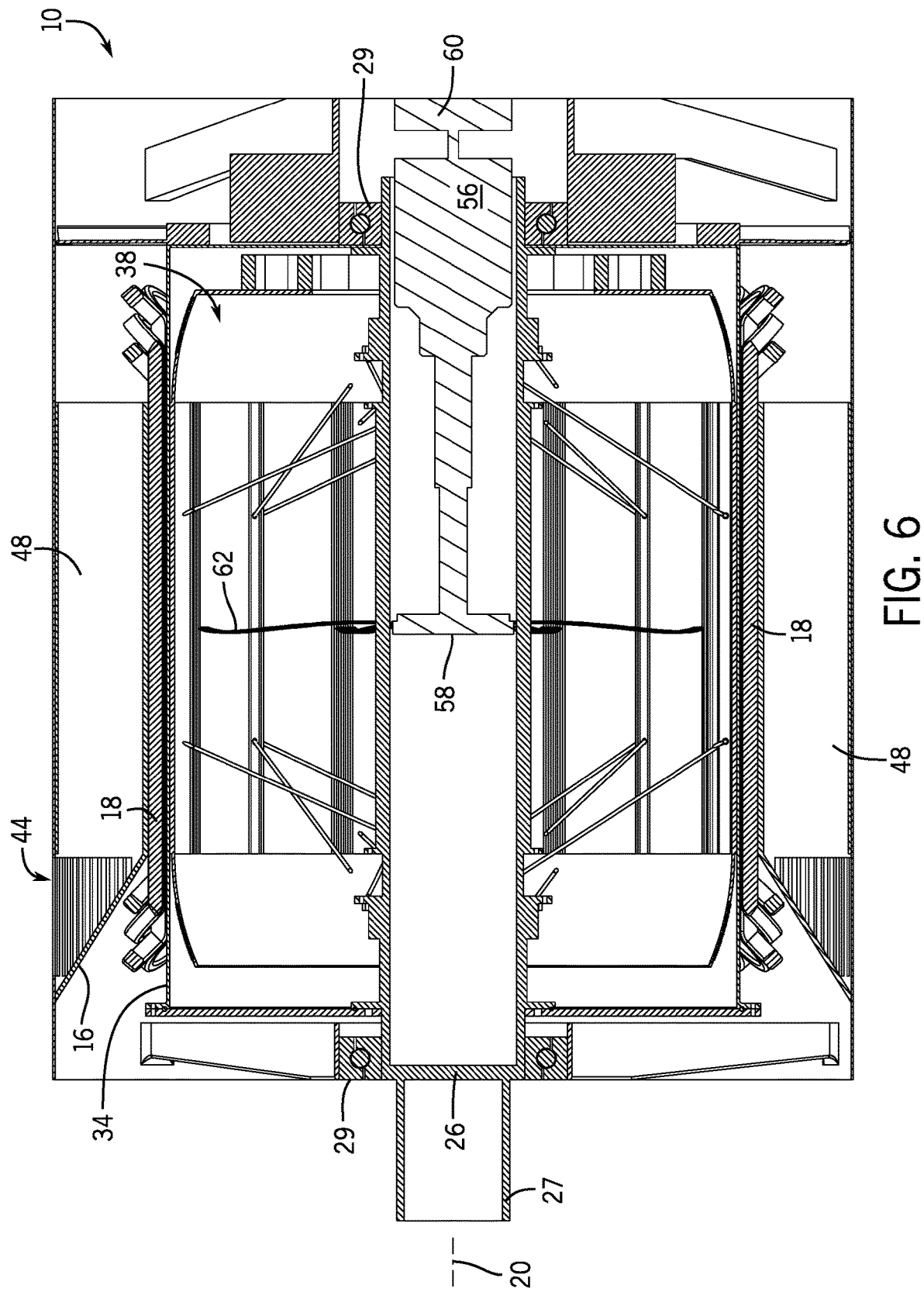

Referring now to FIGS. 1 and 6, a cylindrical vacuum envelope 34 closely surrounds the stator shell 28 and includes end caps 36a and 36b providing bases to the cylinder and sealing the ends of the vacuum envelope 34 against the outer circumference of the shaft 26 to provide an airtight volume 38 that may be evacuated to reduce convective heat loss between the shell 28 and outside structures of the motor and between the shell 28 and the shaft 26. End cap 36b may have a radially outwardly extending impeller 41 pulling air, as indicated by airflow 42, over the outer surface of the stator form 14 for cooling of the same as the rotor 24 rotates.

Figure 7:
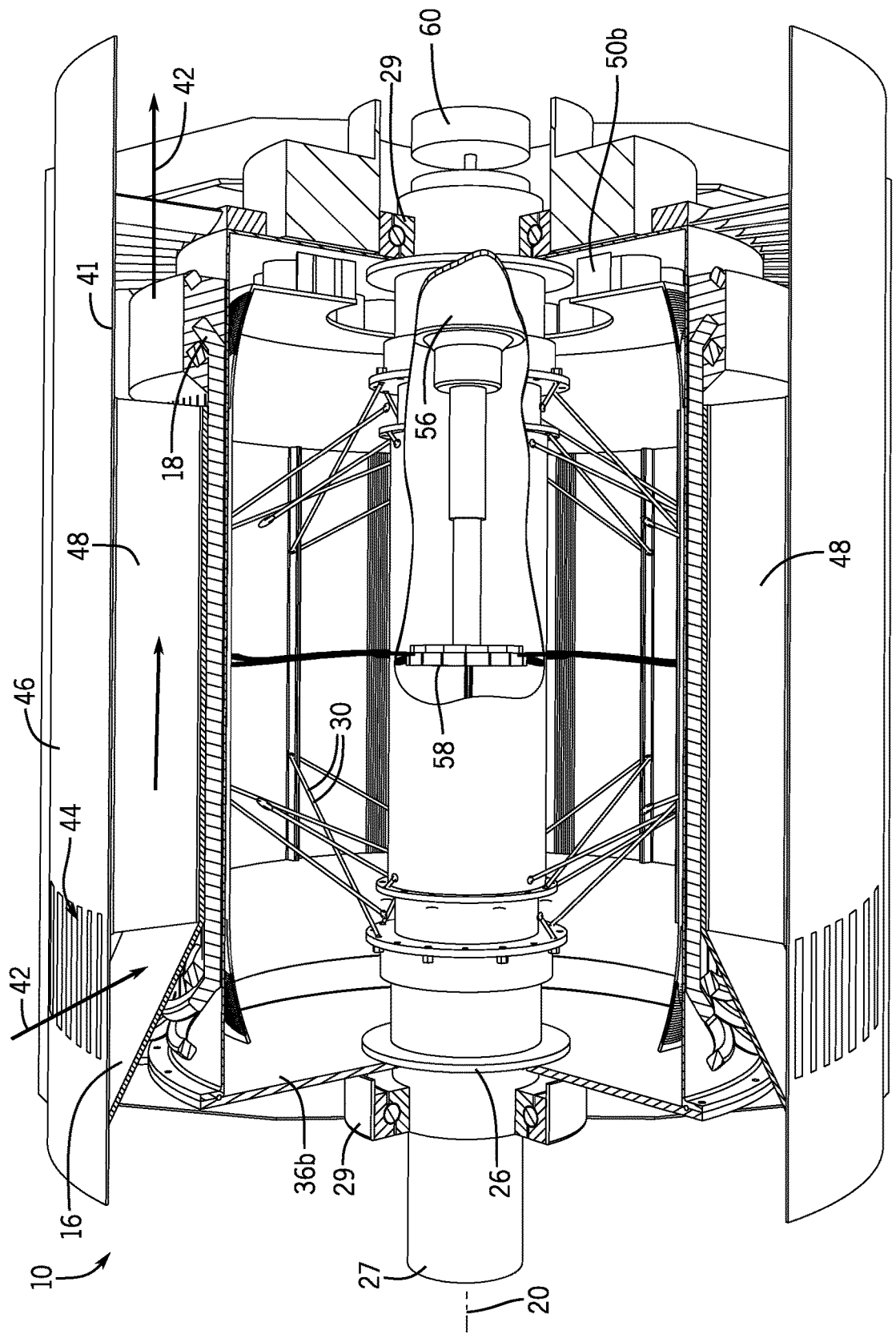
FIGS. 7 and 8 are cutaway elevational views of the assembled motor showing two air paths for cooling the stator.

Referring momentarily to FIG. 7, the cooling airflow 42 may be drawn through a set of slots 44 in a wall of an outer cylindrical motor shroud 46 near the driveshaft 27. This airflow 42 is then guided inwardly by the flared end 16 of the stator form 14 for reduced turbulence and may pass through a set of radially-extending cooling fins 48 communicating with the stator coils 18 via the supporting structure of the stator form 14, and then pass the impeller 41.

Figure 8:
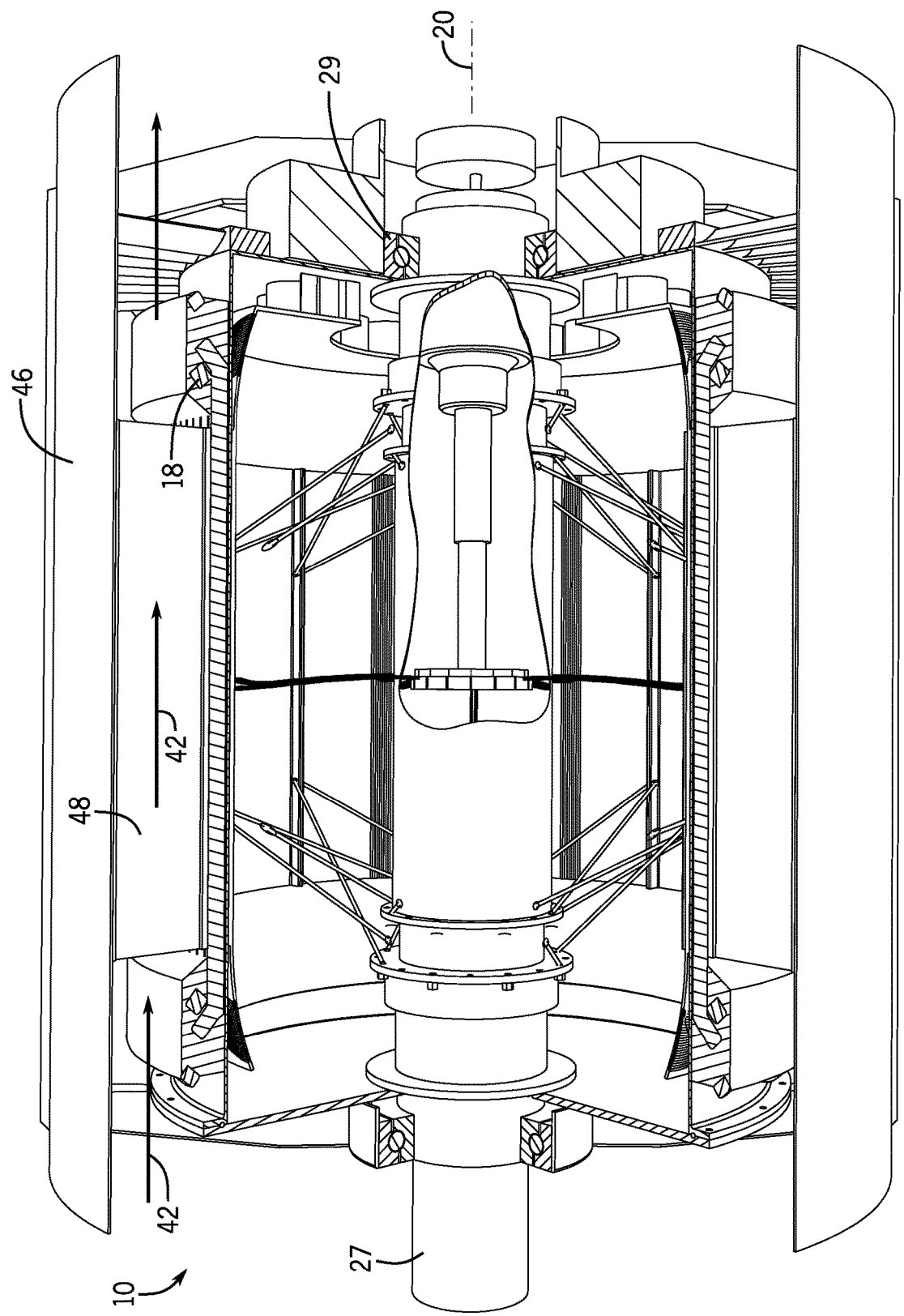

In an alternative low-turbulence embodiment shown in FIG. 8, the flared end 16 may be eliminated in favor of purely axial airflow 42 through open ends of the motor shroud 46.

Referring again to FIG. 1, positioned on either side of end cap 36a are wireless transmission coils 50a and 50b forming a primary and secondary windings of a transformer for transferring power through the vacuum envelope 34 without breach thereof to provide excitation power to the rotor coils 32. Coil 50 may be energized by a high-frequency power source 52, and coil 50b may communicate with the rotor coils 32 by means of a power conditioner 54 providing solid-state rectification and filtering of the alternating current transferred between the transmission coils 50a and 50b to produce the necessary DC voltages for the rotor coils 32. Other systems for wirelessly providing current to the coils 32 include contactless flux pumps of a type known in the art.

Referring now to FIGS. 1, 2, 3, and 4, a cryocooler 56 may extend along the axis 20 and have a cold end 58 passing into the hollow tubular shaft 26 to be roughly centered within the ends of the rotor 24 and attached to the shaft 26 by insulating supports to rotate therewith. A hot end 60 of the cryocooler 56 may be extended outside of the vacuum envelope 34 and be fixed to a stationary structure so that rotation between the cold end 58 and hot end 60 may drive a sterling cycle heat pump pumping heat from the cold end 58 to the hot end 60 (at ambient temperatures) to bring the temperature of the cold end 58 to cryogenic temperatures of less than 500 Kelvin. Cryocoolers 56 suitable for use with the present invention are commercially available, for example, from the Sunpower Division of AMTEK of Berwyn, Pennsylvania, under the trade name CryoTel GT Thermally conductive straps 62 extend radially at equal angles about the cold end 58 to be thermally connected to axially-extending thermal leads 64 attached to the inner surface of the rotor shell 28 and serving to draw heat from the motor coils 32 to the cold end 58. Generally, the conductive straps 62 pass through openings in the shaft 26 to be thermally insulated therefrom. The material of the conductive straps 62 may, for example, be a conductive metal such as copper and may be flexible to accommodate thermal contractions during cool down of the rotor shell 28. Operation of the cryocooler 56 brings the rotor coils 32 down to cryogenic temperatures of less than 50K suitable for providing superconductivity in the coils 32, or temperatures of less than 77° Kelvin suitable for high temperature superconductivity.

Figure 4:
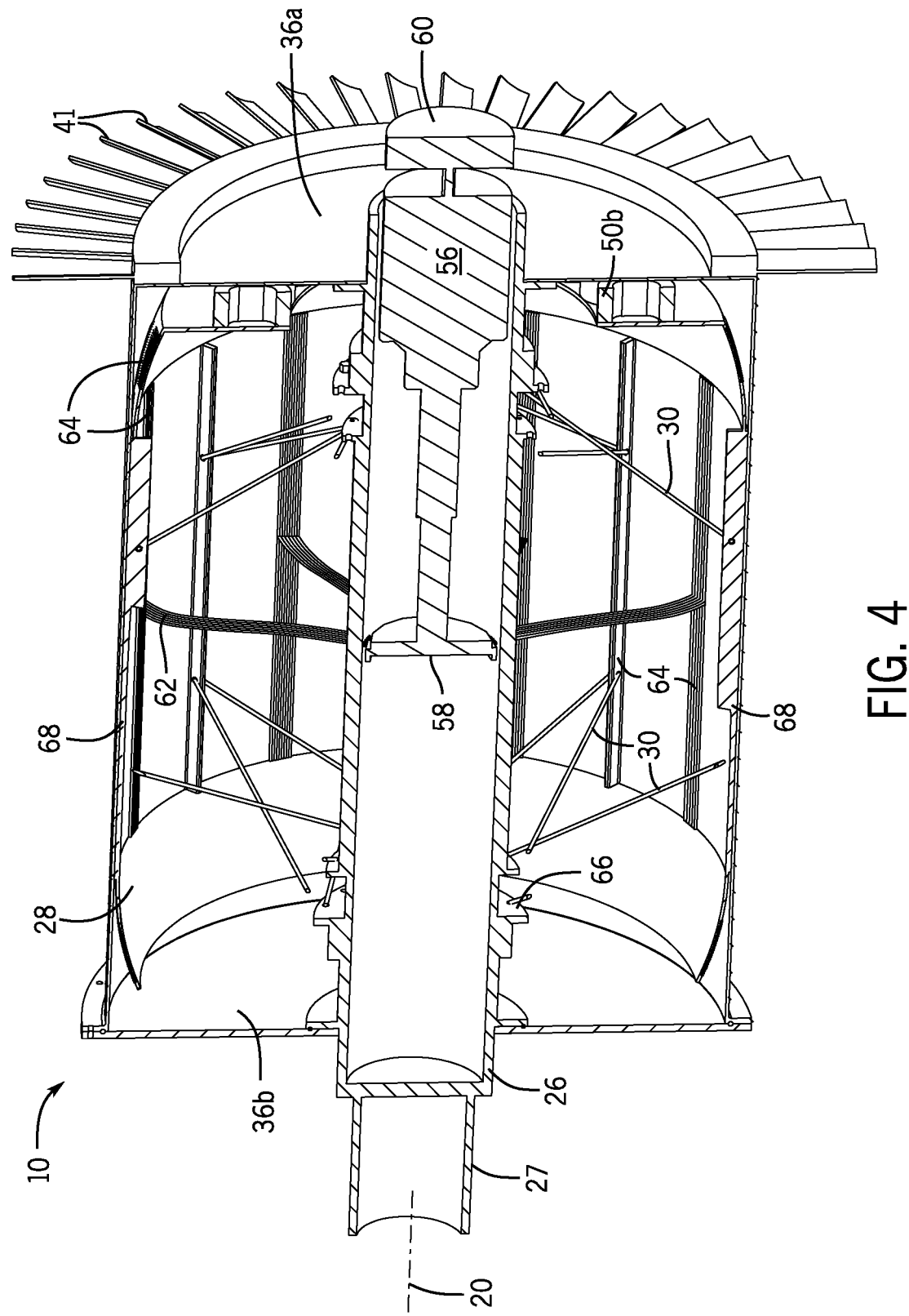
FIG. 4 is a cross-sectional perspective view along a vertical plane of the assembled motor of FIG. 1 showing fitting of the cryocooler within a hollow driveshaft.
Figure 5:
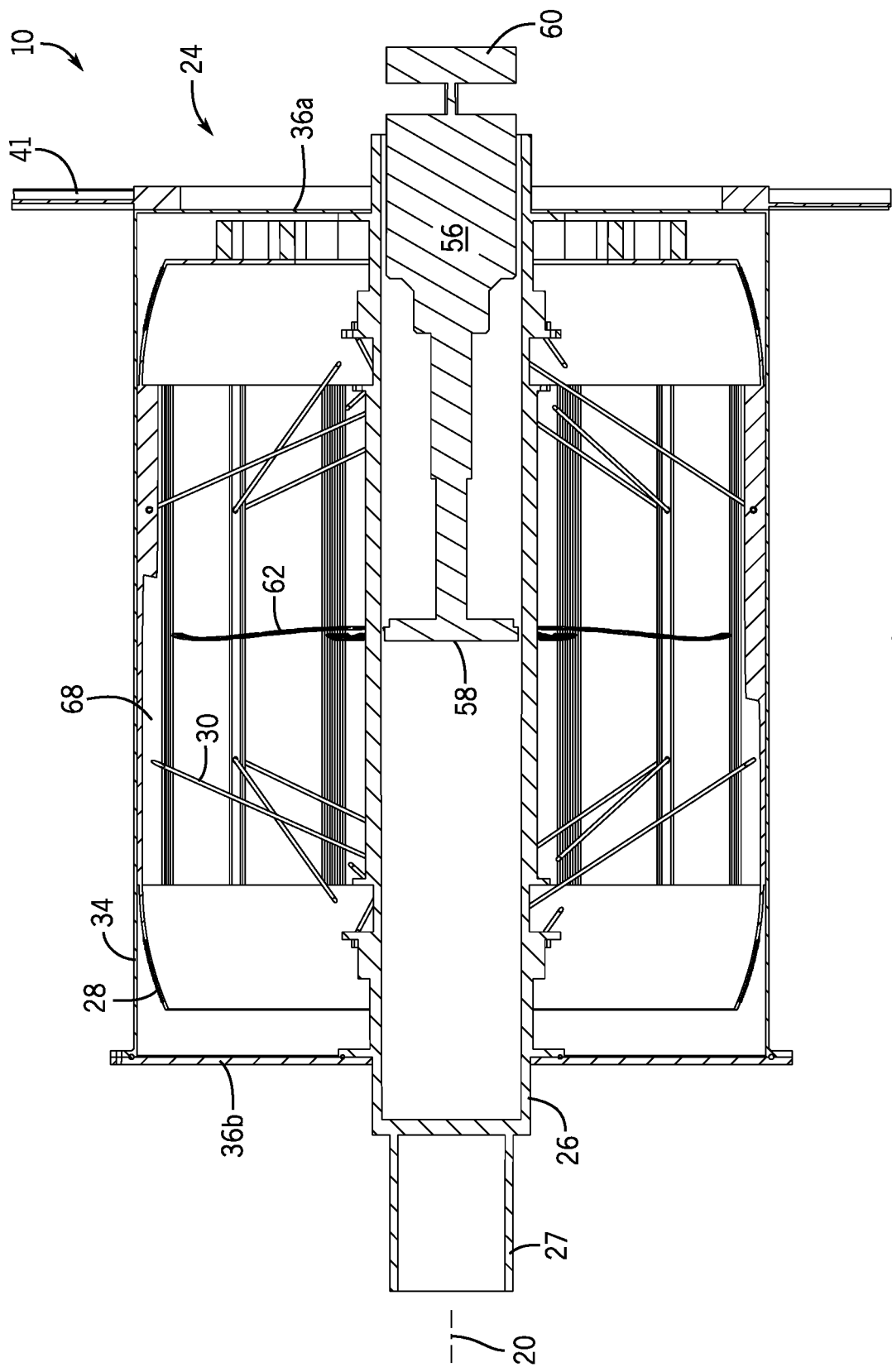
FIG. 5 and FIG. 6 are cross-sectional views similar to that of FIG. 4 showing the spoke structure and vacuum envelope.

Referring now to FIGS. 2 and 4, the spokes 30 may attach to axially-spaced spoke terminal ring 66, each providing a radially-extending flange attached around the shaft 26 with the spokes passing substantially tangentially therefrom for maximum torsion resistance and reduced tensile forces. The outer ends of the spokes 30 attach to radially inwardly extending support ribs 68 attached to and passing axially along the inside of the rotor shell 28. The spokes 30 are angled in opposite directions (clockwise and counterclockwise) away from axially-extending and radially-extending planes through the shaft 26 about the axis 20 and also extend inwardly toward the center of the rotor 24 along the axis away from radially-extending planes normal to the axis 20 to provide resistance against axial motion between the shaft 26 and the shell 28 thereby reducing cooling load. This low thermal conductance is a result of a limited cross-sectional area of the spokes and the use of high tensile strength, low thermal conductivity materials such as Kevlar™ (Poly (azanediyl-1,4-phenyleneazanediylterephthaloyl), nylon, polyethylener or the like including materials generally having a Young's modulus of no less than substantially 70 GPa and a thermal conductivity of less than 2 W/mK or less than 0.5 W/m-k in some embodiments. In some embodiments, the material of the spokes 30 will be a polymer and not a metal; however, metals including stainless steel and titanium alloys may also be practical. The invention also contemplates material such as carbon fiber and glass fiber composites. Importantly, the spokes 30 should have a high yield strength to thermal conductivity, for example, greater than 10,000,000σys/k, where σ$_{ys}$ is measured in MPa and K as W/m/k. It will be understood that the spokes 30 are generally flexible but provide rigid connection between the shaft 26 and shell 28 by means of tension which may be set to accommodate contraction of the shell 28 after assembly and cooling to cryogenic temperatures. Generally, the spokes 30 will be flexible, for example, and bend by more than 20° when held horizontally at one end and extend horizontally over distance of 1 m.

During manufacture, the spokes 30 maybe preloaded statically to less than half of their yield stress so that they have capacity to resist torsion during use. This pre-tensioning is in part caused by the cool down of the rotor shell 28 which may be calculated and used for this purpose in determining the static tensioning.

The angle of the spokes 30 with respect to the axis 20 (in multiple dimensions) may be selected to compensate for changes in dimension of the rotor shell 28 at non-cryogenic temperatures and dimensions of the rotor shell 28' to cryogenic temperatures. In this cooling process, the dimensions of the rotor shell 28' experience a radial shrinkage 92 and axial shrinkage 94 with respect to the rotor shell 28 at non-cryogenic temperatures. These multiple dimensions of change can be exploited so that a shift in the mounting point 100 between the spokes 30 and the rotor shell 28 as the rotor shell 28 cools to cryogenic temperatures, moves along a line of radius 102 (or spherical surface) centered about the mounting point 28, 34, or 66 to minimize tension loss. The selected angle may also take into account the effect of cryogenic temperatures on the dimensions of the spokes 30. All spokes 30 may be angled appropriately for this purpose.

Figure 9:
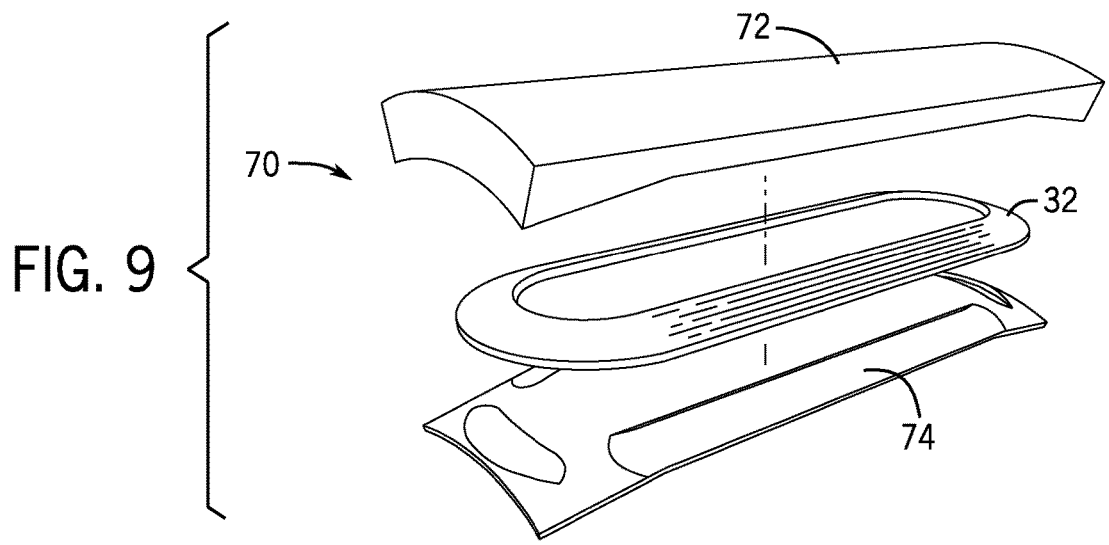
FIG. 9 is a perspective view of a mold for molding the rotor coils including a rotor shell component used as a portion of the mold.
Figure 10:
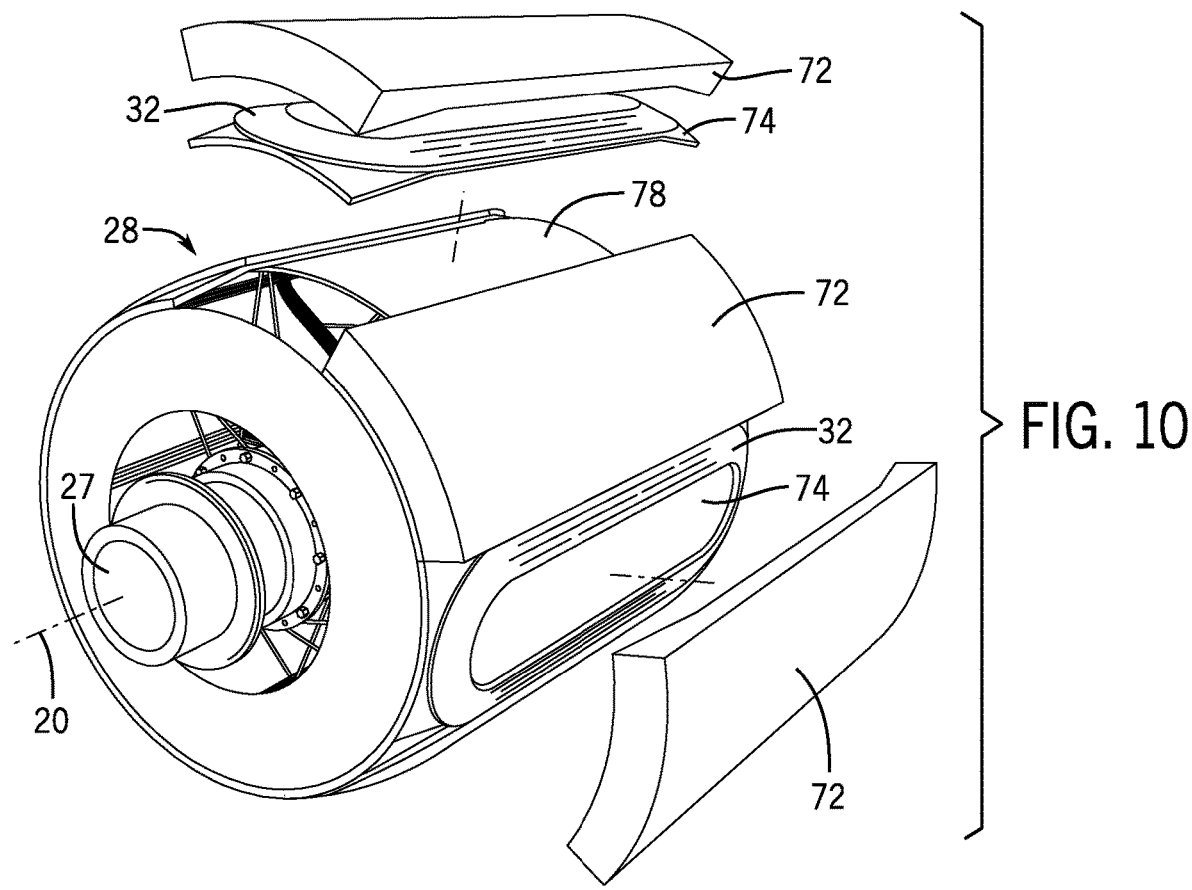
FIG. 10 is a perspective exploded view of an assembly of the coils to form the rotor shell after molding.

Referring now to FIGS. 9 and 10, the rotor coils 32 may be infused with a stabilizing polymer or epoxy material when placed in a mold 70 formed of outer mold portion 72 and inner mold portion 74 which, when assembled together, define a volume substantially equal to the volume of the coil 32. Mold portion 72 may have a release material or natural lubricity to release it from the stabilizing material; however, mold portion 74 may be designed to adhere to the stabilizing material and the coil 32 to provide a strong supportive substrate for the coil 32. Mold portion 74 after release from the mold portion 72 is attached to an inner element 78 of the rotor shell 28 by an adhesive thereby, together with the inner element 78, to complete the structure of the shell 28. For this purpose, the inner mold portion 74 may be constructed of a material with high thermal conductivity (to promote cooling through the shell 28), high electrical insulation, and high strength under cryogenic temperatures such as boron nitride. It will be understood that the coils 32 may likewise be molded directly to the rotor shell 28 providing the mold portion 74 in an integrated manner.

Figure 11:
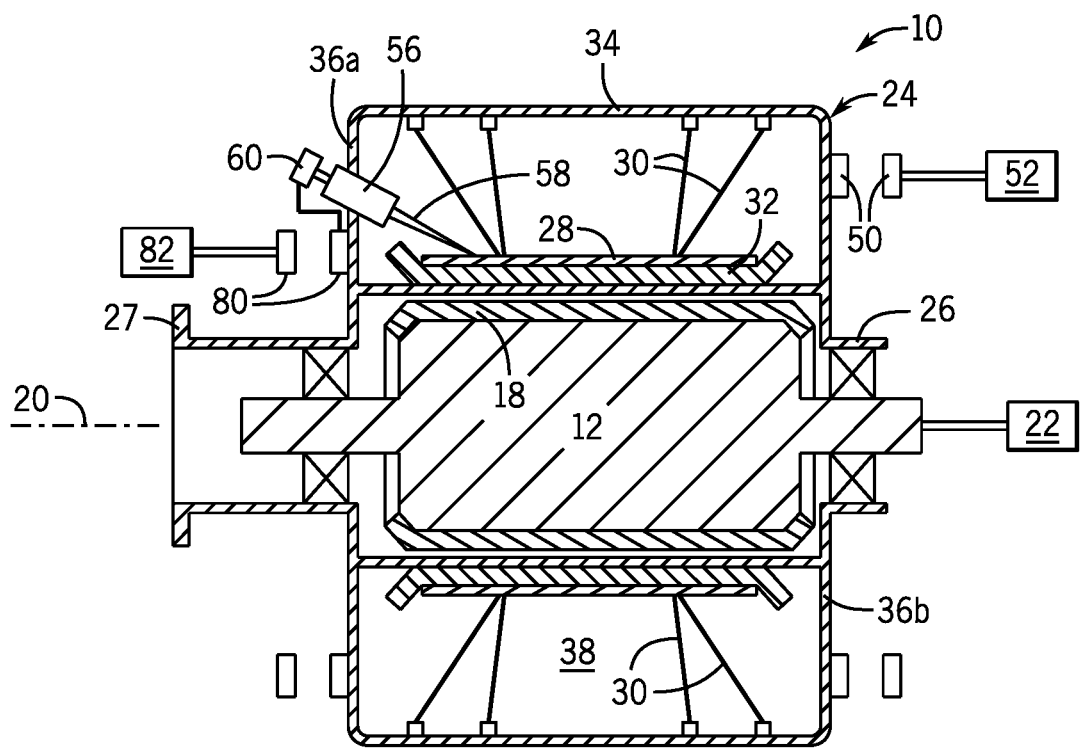
FIG. 11 is an elevational cross-sectional view of an alternative motor design having an external rotor and using spokes extending away from the shaft.

Referring now to FIG. 11, the principles and structures described above may be readily adapted to an outer rotor design in which the rotor 24 rotates outside of the stator 12 with the rotor coils 32 surrounding and outside of the stator coils 18. In this case, the vacuum envelope 34 provides an airtight volume 34 in the form of a cylindrical annulus centered about the axis 20. Spokes 30 may pass from an outer wall of the vacuum chamber 34 inwardly to the shell 28 to provide, in tension, support for the shell 28 as will be thermally isolated from the walls of the vacuum envelope 34. The cryocooler 56 may be attached to the vacuum envelope 34 to rotate therewith and be provided with power by means of inductively coupled coils 80 receiving power through a stationary power source 82 in the manner of coils 50 described above. The cold head 58 of the cryocooler 56 may directly contact the shell 28 or may communicate thermally through intermediate conductors or the like. In this design torque is transmitted through the walls of the vacuum envelope 34 to the driveshaft 26.

Figure 12:
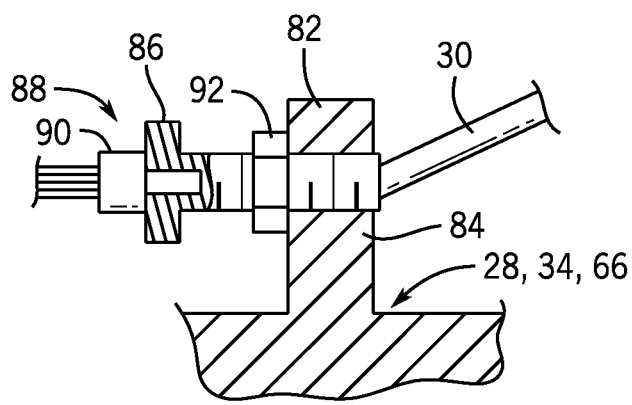
FIG. 12 is a fragmentary cross-section of a mechanism for terminating the spokes allowing tension adjustment.
Figure 13:
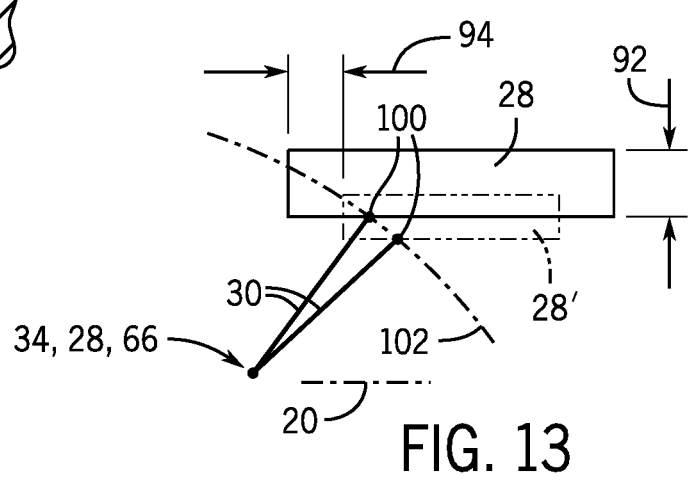
FIG. 13 is a simplified elevational cross-section of the rotor ring and spoke angulation showing selection of the angulation to compensate for cryogenic contraction.

Referring now to FIG. 12, the spokes 30 may attached to the respective supporting structure of the rotor shell 28, the vacuum envelope 34, or the terminal rings 66 at flange portions 82 having a threaded hole 84 therethrough. The threaded hole 84 may receive a tubular collar 86 having matching threads engaging the threaded hole 84 and a protruding end 88 having wrench flats or the like. The spoke 30 passes through the tubular collar 86 and past the protruding end 88 where the spoke 30 has a formed or crimped on head 90 larger than the opening in the tubular collar 86. In this way, a rotation of the tubular collar 86 may change the spacing between the flanged portion 82 and the head 90 thereby allowing adjustment of tension of the spoke 30. A lock nut 92 fitting around a threaded portion of the threaded collar 86 may be tightened against the flanged portion 82 to lock the assembly against rotation and vibration.

While generally, it is contemplated that the spokes 30 may be a uniform material uninterrupted in their communication between the rotor shell 28 and other supporting structure, it will be appreciated that composite or multipart spokes 30 may also be used, for example, having different materials along their length, for example, a material with higher thermal conductivity interrupted by short intervals of thermally blocking material or the like, and thus that the bulk properties of the spokes 30 must be considered with respect to the limitations and designs described herein.

In addition, while the above description is generally focused on the construction of a motor, it will be appreciated that the same principles will produce an electrical generator and thus the invention generally involves an electrical machine rather than a motor or generator particularly.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A superconducting machine comprising:
    a stator; and
    a rotor having a central shaft rotatably mounted with respect to the stator to allow the rotor to rotate about a shaft axis with respect to the stator, wherein the rotor includes:
    a set of elongate spokes having a principal axis defined by a largest dimension of the spoke;
    wherein the principal axes of different spokes extend at different angles from the rotor with respect the rotor radius at a point of attachment of each spoke to the central shaft;
    a rotor shell suspended about the shaft by a tension among the elongate spokes passing between the rotor shell and the shaft; and
    a set of superconducting windings positioned on the rotor shell.

2. The superconducting motor of claim 1 wherein the spokes are polymer material.

3. The superconducting machine of claim 2 wherein the spokes are composed of a material chemically identical to materials selected from the group consisting of Kevlar™, Mylar™, and Kapton™.

4. The superconducting machine of claim 1 wherein the spokes are constructed of a material having a thermal conductivity of less than 2 W/mK and a Young's modulus of greater than 200.

5. The superconducting machine of claim 1 wherein the principal axes of the spokes attached to the central shaft at a given axial location along the central shaft have different circumferential angles perpendicular to the shaft axis.

6. The superconducting machine of claim 4 wherein the principal axes of the spokes extending from an axial location on the central shaft have different angles with respect to the shaft axis.

7. The superconducting machine of claim 1 wherein the principal axis of the spokes are angled axially away from lines of radius about the shaft axis at an angle adapted to maintain tension as the rotor shell is cooled to cryogenic temperatures during operation.

8. The superconducting machine of claim 1 wherein the superconducting windings are planar coils conformed to a substantially cylindrical surface of the rotor shell and wherein the rotor shell is nonferrous.

9. The superconducting machine of claim 8 wherein the superconducting windings are helical windings.

10. The superconducting machine of claim 1 further including a cryocooler.

11. The superconducting machine of claim 10 wherein the cryocooler has a cold end extending coaxially inside the rotor shell and providing thermal conductors having a radial extent communicating between the cold end and the superconducting windings on the rotor shell.

12. The superconducting machine of claim 11 wherein the radially extending conductors are metal conductors.

13. The superconducting machine of claim 11 wherein the shaft is tubular and the cold end extends inwardly through the tubular shaft.

14. The superconducting machine of claim 10 wherein the cryocooler is a sterling cycle cooler.

15. The superconducting machine of claim 1 further including a vacuum envelope fixed to the rotor to rotate therewith to contain the rotor shell within a vacuum.

16. The superconducting machine of claim 15 further including a wireless power transfer circuit having a first portion stationary with respect to the stator and outside of the vacuum envelope and a second portion attached to rotate with the rotor inside of the vacuum envelope for wireless transfer of power from the first portion to the second portion; wherein the second portion communicates with the set of superconducting windings to provide exciting power to the windings for a production of a magnetic field.

17. The superconducting machine of claim 1 wherein the rotor further attaches to an impeller extending radially from the rotor to blow air over a surface of the stator adapted to cool the stator.

18. The superconducting machine of claim 1 wherein the rotor shell provides a set of attachable forms underlying each superconducting winding adapted to allow molding of the winding to the form and subsequent assembly of the form into the shell.

19. The superconducting machine of claim 1 wherein the superconducting machine is a synchronous machine.

20. The superconducting machine of claim 1 wherein at least one end of each spoke is fixed to a radially extending head and passes through supporting structure providing a tubular collar, the tubular collar being threadably received by the supporting structure to provide a variable spacing between the head and the supporting structure for tensioning the spoke.

21. The superconducting machine of claim 1 wherein the principal axes of the spokes extend radially outward from the shaft.

22. The superconducting machine of claim 1 further including an annular vacuum envelope surrounding the superconducting windings and spokes and providing a set of cryocoolers distributed angularly along a radial wall of the vacuum envelope with cold ends of the cryocoolers communicating with an interior of the vacuum envelope and hot ends of the cryocoolers communicating with an outside of the vacuum envelope.

23. The superconducting machine of claim 1 wherein the spokes are a composite of different materials.

24. The superconducting machine of claim 23 wherein the different materials have different thermal conductivity.

25. The superconducting machine of claim 24 wherein a cross-sectional area of at least one of the materials varies along a length of a spoke.

26. The superconducting machine of claim 1 wherein the spokes have a flexibility to bend by at least 20° when held horizontally at one end and extending horizontally over a distance of 1 m.

\* \* \* \* \*